(12) United States Patent
Lewin et al.

(10) Patent No.: US 11,198,244 B2
(45) Date of Patent: Dec. 14, 2021

(54) METHOD AND DEVICE FOR BLOW-MOLDING CONTAINERS WHICH ARE STERILE AT LEAST IN SOME AREAS

(71) Applicant: KHS GmbH, Dortmund (DE)

(72) Inventors: Frank Lewin, Tangstedt (DE); Thomas Herold, Ahrensburg (DE); Jan Fabian Meyer, Hamburg (DE); Martin Gerhards, Hamburg (DE); Dieter Klatt, Hamburg (DE); Rolf Baumgarte, Ahrensburg (DE)

(73) Assignee: KHS GmbH, Dortmund (DE)

( * ) Notice: Subject to any disclaimer, the term of this patent is extended or adjusted under 35 U.S.C. 154(b) by 278 days.

(21) Appl. No.: 14/911,629

(22) PCT Filed: Aug. 13, 2014

(86) PCT No.: PCT/EP2014/002220
§ 371 (c)(1),
(2) Date: Feb. 11, 2016

(87) PCT Pub. No.: WO2015/024641
PCT Pub. Date: Feb. 26, 2015

(65) Prior Publication Data
US 2016/0193776 A1 Jul. 7, 2016

(30) Foreign Application Priority Data
Aug. 19, 2013 (DE) ..................... 10 2013 013 590.7

(51) Int. Cl.
*B29C 49/46* (2006.01)
*B29C 49/42* (2006.01)
(Continued)

(52) U.S. Cl.
CPC .......... *B29C 49/46* (2013.01); *B29C 49/4205* (2013.01); *B29C 49/4252* (2013.01);
(Continued)

(58) Field of Classification Search
CPC .... B29C 2049/4682; B29C 2049/4635; B29C 49/4252; B29C 49/06; B29C 49/28;
(Continued)

(56) References Cited

U.S. PATENT DOCUMENTS

| 4,076,071 A | 2/1978 | Rosenkranz et al. |
| 5,129,212 A | 7/1992 | Duffey et al. |

(Continued)

FOREIGN PATENT DOCUMENTS

| CN | 1646375 A | 7/2005 |
| CN | 101528271 A | 9/2009 |

(Continued)

*Primary Examiner* — Marc C Howell
*Assistant Examiner* — John J DeRusso
(74) *Attorney, Agent, or Firm* — Rankin, Hill & Clark LLP

(57) ABSTRACT

A method and a device for producing blow-molded containers which are sterile at least in some areas. A preform made of a thermoplastic material is first heated in a heating device on a transport path through a blow-molding machine and then supplied with a pressurized fluid in a blow-molding station of the device. The preform is guided along a channel, which conducts a sterile gas, at least over one sub-section of the transport path of the preform. The transport path of the preform out of the channel is supplied with the sterile gas in order to produce a sterile gas corridor in which at least the opening region of the preform is guided. Multiple radiation sources are arranged along the channel and one behind the other in the transport direction. The radiation sources emit a sterilizing radiation onto the preform and/or onto the channel, and/or onto the sterile gas corridor.

12 Claims, 7 Drawing Sheets

(51) Int. Cl.
  *B65B 3/02* (2006.01)
  *B65B 7/16* (2006.01)
  *B65B 55/08* (2006.01)
  *B29C 49/06* (2006.01)
  *B29C 49/68* (2006.01)
  *B29K 67/00* (2006.01)
  *B29K 105/00* (2006.01)
  *B29L 31/00* (2006.01)

(52) U.S. Cl.
  CPC .......... *B29C 49/4273* (2013.01); *B65B 3/022* (2013.01); *B65B 7/16* (2013.01); *B65B 55/08* (2013.01); *B29C 49/06* (2013.01); *B29C 49/4268* (2013.01); *B29C 49/68* (2013.01); *B29C 2049/4682* (2013.01); *B29K 2067/003* (2013.01); *B29K 2105/258* (2013.01); *B29L 2031/712* (2013.01)

(58) Field of Classification Search
  CPC . B29C 49/46; B29C 49/42; A61L 2/16; A61L 2/20; A61L 2/208; B65B 3/022
  See application file for complete search history.

(56) References Cited

U.S. PATENT DOCUMENTS

| | | |
|---|---|---|
| 5,346,386 A | 9/1994 | Albrecht et al. |
| 5,648,026 A | 7/1997 | Weiss |
| 6,692,684 B1 | 2/2004 | Nantin et al. |
| 8,092,757 B2 | 1/2012 | Adriansens et al. |
| 2005/0118057 A1 | 6/2005 | Quetel et al. |
| 2009/0317506 A1 | 12/2009 | Adriansens |
| 2010/0047120 A1 | 2/2010 | Adriansens et al. |
| 2010/0089009 A1 | 4/2010 | Till |
| 2011/0016829 A1 | 1/2011 | Drenguis |
| 2011/0133370 A1 | 6/2011 | Engelhard et al. |
| 2012/0042611 A1* | 2/2012 | Lappe ................... A61L 2/232 53/426 |
| 2012/0223464 A1 | 9/2012 | Voth et al. |
| 2013/0078327 A1 | 3/2013 | Adriansens |
| 2013/0154164 A1 | 6/2013 | Laumer et al. |
| 2013/0328248 A1 | 12/2013 | Herold et al. |
| 2014/0325941 A1 | 11/2014 | Knott et al. |

FOREIGN PATENT DOCUMENTS

| | | | |
|---|---|---|---|
| DE | 2352926 A1 | 4/1975 | |
| DE | 4212583 A1 | 10/1993 | |
| DE | 4340291 A1 | 6/1995 | |
| DE | 29503830 * | 6/1995 | ............... A61L 9/20 |
| DE | 19906438 A1 | 8/2000 | |
| DE | 60306349 T2 | 6/2007 | |
| DE | 2138298 A2 * | 12/2009 | |
| DE | 202009010813 U1 | 12/2009 | |
| DE | 102007017938 B4 | 1/2010 | |
| DE | 102010026166 A1 | 1/2012 | |
| DE | 102011013125 A1 | 9/2012 | |
| DE | 102011107772 A1 | 1/2013 | |
| DE | 202008018392 U1 | 10/2013 | |
| EP | 1086019 B1 | 9/2005 | |
| EP | 1896245 B1 | 5/2009 | |
| EP | 2138298 A1 | 12/2009 | |
| EP | 2604410 A1 | 6/2013 | |
| FR | 2464816 A1 | 3/1981 | |
| JP | 2005528242 A | 9/2005 | |
| JP | 2010507503 A | 3/2010 | |
| JP | 2011514292 A | 5/2011 | |
| WO | 2006136499 A1 | 12/2006 | |
| WO | 2010020530 A1 | 2/2010 | |
| WO | 2011154294 A1 | 12/2011 | |
| WO | 2012083910 A1 | 6/2012 | |

* cited by examiner

METHOD AND DEVICE FOR BLOW-MOLDING CONTAINERS WHICH ARE STERILE AT LEAST IN SOME AREAS

The present application is a 371 of International application PCT/EP/2014/002220, filed Aug. 13, 2014, which claims priority of DE 10 2013 013 590.7, filed Aug. 19, 2013, the priority of these applications is hereby claimed and these applications are incorporated herein by reference.

BACKGROUND OF THE INVENTION

The invention relates to a method and a device for producing blow-molded containers which are sterile at least in some areas, in which a preform made of a thermoplastic material is first heated and is then supplied with a pressurized fluid, and in which the preform is guided, at least over one sub-section of its transport path, along a channel, which conducts a sterile gas, wherein the transport path of the preform out of the channel is supplied with the sterile gas in order to produce a sterile gas corridor in which the preform is guided.

The invention further relates to a device for producing blow-molded containers which are sterile at least in some areas, which device is provided with a heating section for the temperature conditioning of the preforms and with a blow-molding device for the blow-molding of the preforms into the containers, wherein a channel which conducts a sterile gas is arranged along at least one sub-section of the transport path for the preform, which channel supplies the movement path of the preform with sterile gas in order to produce a sterile gas corridor, wherein the preform is guided on its transport path along this channel and inside the sterile gas corridor.

The production of blow-molded containers which are sterile, at least in some areas, takes place according to a first prior art in such a way that these containers are sterilized, after blow-molding and before filling, using hydrogen peroxide or other chemicals. It is also familiar from a second prior art to sterilize the preforms, and in particular the region of the internal surface of these preforms, that are used as a starting product in the blow-molding of the containers.

In the process of molding containers by the effect of blowing pressure, preforms made of a thermoplastic material, for example preforms made of PET (polyethylene terephthalate), are fed to various processing stations inside a blow-molding machine. A blow-molding machine of this kind typically has a heating device, for example in the form of an oven with heater boxes, together with a blower device, in the region of which the previously temperature-conditioned preform is expanded to form a container by biaxial orientation. Expansion takes place as a rule with the help of compressed air, which is introduced into the preform to be expanded. The process engineering sequence involved in this type of preform expansion is explained in DE-OS 43 40 291.

The basic construction of a blow-molding station for molding containers is described in DE-OS 42 12 583. The possibilities for temperature conditioning the preforms are explained in DE-OS 23 52 926.

The preforms and the molded containers can be transported inside the device for blow-molding with the help of various kinds of handling equipment. The use of transport mandrels, on which the preforms are inserted, has proved to be particularly successful. However, the preforms can also be handled with other supporting devices. The use of grippers for handling preforms and the use of expanding mandrels, which can be introduced into an opening region of the preform as a means of support, are also included in the available designs.

Handling of containers involving the use of transfer wheels is described in DE-OS 199 06 438, for example, in the case of the arrangement of the transfer wheel between a blowing wheel and a discharge section.

The previously explained handling of the preforms takes place, on the one hand, in so-called two-stage processes, in which the preforms are initially produced in an injection molding process, are then placed in temporary storage and are only subsequently conditioned in respect of their temperature and are blow-molded to form a container. On the other hand, an application is used in the so-called single-stage process, in which the preforms are appropriately temperature-conditioned and are then blow-molded immediately after their manufacture by injection molding.

Different embodiments are familiar with regard to the blow-molding stations that are used. The ability of the mold carriers to fold like a book is frequently encountered in the case of blow-molding stations which are arranged on rotating transport wheels. It is also possible, however, to use mold carriers that are capable of displacement relative to one another or of being guided in some other way. Plates arranged parallel to one another are typically used as mold carriers in the case of fixed blow-molding stations, which are particularly suitable for accommodating multiple cavities for forming containers.

Various methods and devices are already familiar from the prior art with respect to the sterilization of preforms, although all of these exhibit process-specific disadvantages, which are incompatible with the reliable production of containers that are sterile at least in some areas by blow-molding from preforms accompanied by simultaneously high throughput rates.

The sterilization of hot preforms with a hot, gaseous sterilizing agent is described in EP-A 1 086 019, for example. Separate processing stations arranged one after the other, namely a first heating module, a sterilizing module and a second heating module, are used. A disadvantage associated with this is the temperature behavior of the preform during the sterilization process and the uncontrolled escape of the sterilizing agent from the preform in the course of the heating process. A further disadvantage is that microbiological recontamination can occur on completion of the sterilization in the sterilizing module.

A method is described in EP-A 1 896 245, in which a gaseous sterilizing agent is introduced into a cold preform upstream of the heating device and condenses there. The problem in this case is to ensure the complete formation of condensate on the entire internal surface of the preform, since the inflowing hot sterilizing agent has the effect of increasing the temperature of the internal wall of the preform. In this case, too, the sterilizing agent after its evaporation in the area of the heating also exits from the preform in an uncontrolled manner inside the heating device. The problem of microbiological recontamination after sterilization of the preform also exists in this case, too.

A device is described in EP-A 2 138 298, in which sterilizing devices are arranged as a precaution both upstream of the utilized blowing module and downstream of the utilized blowing module. This results in a very high mechanical construction cost, which at least in part resolves the problem of microbiological recontamination. The problem of microbiological recontamination continues to exist, however, in respect of the onward transport path of the finished blow-molded bottle as far as a filling device, in which the bottle is filled with a drink, for example, and as far as a closing device, in which the filled bottle is provided with a closure.

The arrangement of a sterilizing device between a heating device and the blowing module is described in WO 2010/020530 A1. In this method, the input quantity of sterilizing agent into the region of the blowing module is very difficult to forecast. In addition, the quantity of sterilizing agent released into the environment is not controllable, and corresponding contamination cannot be excluded. The problem of microbiological recontamination is also not resolved.

After completed sterilization and heating of the preforms, these are fed to a blower device and are transformed into the containers there by the use of sterile blown air. The problem of microbiological recontamination is addressed according to the prior art in that the entire region of the blower device is embodied as a sterile room. The provision and maintenance of such a large sterile room requires a very high appliance-related expenditure. In addition, this spatially extensive region has a multiplicity of potential sources of contamination, such that adequate sterility can be assured only with very considerable difficulty.

A more effective solution is disclosed in WO 2012/083910 A1. A sterile room including the blower device and, where appropriate, further processing devices such as fillers or cappers is not proposed there, but rather a channel conveying a sterile gas is depicted there, along which the preform or the finished blow-molded container is guided. Provided in the channel are exit orifices, from which the sterile gas is able to flow in order to produce a corridor that is supplied with sterile gas. The preform is guided in this sterile gas corridor and in the process is acted upon and surrounded by the sterile gas. Microbiological recontamination is effectively prevented by this means.

SUMMARY OF THE INVENTION

The object of the present invention is to improve a method of the kind mentioned by way of introduction in such a way that the sterility of the blow-molded containers is assured in a simple manner and microbiological recontamination can be prevented even more effectively. The latter aspect can be referred to as maintaining sterility in contrast to sterilization.

This object is accomplished according to the invention in that the preform is guided, at least over one sub-section of its transport path, along a channel which conducts a sterile gas, wherein the transport path of the preform out of the channel is supplied with the sterile gas in order to produce a sterile gas corridor. No microbiological recontamination can occur in this sterile gas corridor, because the flowing sterile gas prevents any microorganisms from entering. The arrangement of at least the opening region of the preform in this sterile gas corridor causes the opening region to be surrounded by the sterile gas, for example by sterile air, and to be isolated from the environment which may contain microorganisms. The opening region of the preform is overlaid at least to some extent with a veil of sterile air or is shielded with a veil of sterile air. According to the invention, it is further proposed that multiple radiation sources are arranged along the channel and one behind the other in the transport direction, said radiation sources emitting a sterilizing radiation onto the preform and/or onto the channel and/or onto the sterile gas corridor. These radiation sources have the further advantage that the effect of suppressing microorganisms and the effect of preventing the ingress of microorganisms of the sterile gas corridor is additionally supported by the germicidal action of the radiation.

These sources of radiation can be arranged in a stationary manner, for example on the channel which conveys sterile gas, or they can accompany the preforms along the transport path, for example by their arrangement on the transport devices for the preforms, for example on the transport star wheels or grippers. The accompanying arrangement can be advantageous in order to supply the preform with radiation in a reliable and uninterrupted manner. The stationary arrangement, on the other hand, offers constructive advantages and facilitates the supply of the radiation sources.

A further object of the present invention is to design a device of the kind mentioned by way of introduction in such a way that the sterility of the blow-molded containers is assured in an even more reliable manner with a simple construction, and that microbiological recontamination is prevented even more effectively.

This object is accomplished according to the invention in that at least one channel which conducts a sterile gas is arranged along at least one sub-section of the transport path for the preforms, which channel has at least one outflow orifice, from which the sterile gas flows in order to form a sterile gas corridor running along the transport path, wherein the channel and the outflow orifice are arranged and configured in such a way that at least the opening region of the preforms is guided in the sterile gas corridor, wherein multiple radiation sources are arranged and oriented along the channel and one behind the other in the transport direction, which radiation sources emit a sterilizing radiation onto the preform and/or onto the channel and/or onto the sterile gas corridor. The advantages have already been referred to in the method according to the invention.

Advantageous embodiments of the invention are referred to in the dependent claims.

The arrangement of the radiation sources takes place advantageously one behind the other in the transport direction on the channel and oriented toward the sterile gas corridor.

Compared with other arrangements, for example remotely from the channel, this has the advantage that no additional mountings are required and, for example, the channel and the emitters are easily retrofitted to existing machines. The orientation of the emitters is also simplified in this way because they can be arranged fixed in relation to the channel, and no subsequent and expensive adjustment is required.

The opening region in particular of the preforms is critical with regard to microbiological recontamination. As a result, at least some of the radiation sources can be oriented with advantage toward the opening region of the preforms, for example by the supply of radiation from a lateral or oblique direction to the height region, through which the opening region of the preforms is guided, or, for example, by the emission of radiation onto the opening region in a vertical direction. In the case of accompanying emitters, for example, the direction of radiation is oriented permanently toward the opening region, so that the desired maintenance of sterility is reliably achieved.

One possible cause of microbiological recontamination may be effectively prevented by the arrangement of multiple radiation sources inside the channel and one behind the other in the transport direction, which radiation sources emit sterilizing radiation onto the internal surfaces of the channel. This ensures that no contamination by microorganisms takes place from the channel into the preform or into the blow-molded container, including through the supplied sterile gas and the outflowing sterile gas from the channel. At the same time, the sterile gas that is guided into the channel is also irradiated continuously and is thus likewise kept reliably free from microorganisms, given that it is already sterile as it is fed into the channel.

For the reliable avoidance of microbiological contamination of the preforms upstream of the blow-molding process, the channel equipped with radiation sources extends advantageously at least from the heating device to the blow-molding device. Further advantages with regard to the reliable avoidance of microbiological contamination are achieved if the channel extends additionally or alternatively at least from the blow-molding device to the filling device, and if the channel extends additionally or alternatively at least from the filling device to the closing device. Channels that are separate from one another can be arranged in the aforementioned regions of extension, which channels, for example, are also supplied separately from one another with sterile gas. In this case, however, these can also be channel sections of a complete channel. It is also possible to supply the channel with sterile gas at a plurality of inflow orifices distributed along the channel, which is especially advantageous if the channel has a large longitudinal extent.

Preferred radiation sources are UV emitters, which are characterized in comparison with alternative radiation sources, for example electron beam emitters, microwave emitters or X-ray emitters, in that they are technically easier to operate and entail less expenditure on shielding. UV emitters are ideally suited in particular for maintaining sterility and offer a cost benefit.

The arrangement of radiation sources that are oriented toward the preforms or toward the containers in the heating device and/or in the blow-molding device and/or in the filling device and/or in the closing device has the advantage that microbiological contamination can also be prevented in these regions. The radiation ensures, in addition, that the aforementioned devices remain free from microbiological contamination, at least in the region through which the preform passes.

Rotating transport wheels have proven to be successful as transport means. Such transport wheels can be arranged on the input side of the blow-molding machine, for example, or between the heating device and the blow-molding device, or between the blow-molding device and a filling device connected downstream thereof, or between a filling device and a closing device connected downstream thereof. In all these cases, it is advisable for the channel equipped with emitters to extend at least along part of the circumference of the transport wheel, on which transport takes place. This is because microbiological contamination can potentially take place in all of these aforementioned transitional regions between the various processing stations, so that the maintenance of sterility is desirable.

The radiation sources referred to above can also be used with particular advantage during the start-up mode of the blow-molding machine, in conjunction with which any filling devices and closing devices that are connected downstream should also be assumed to bring about sterilization of the machine or specific regions of the machine. The emitters are also switched on for this purpose during the start-up phase, and as a result they are able to produce their sterilizing effect. This applies equally to interruptions in the blow-molding process, during which the blow-molding machine continues in in-line operation, that is to say it has not yet been shut down. The emitters can also advantageously remain switched on during this in-line operation, in order to produce a sterilizing effect.

The radiation sources can operate in pulsed mode, for example, or can emit radiation permanently in continuous service. It is known, for example, that UV emitters operating in pulsed mode are able to emit radiation of particularly high intensity. To the extent that switched-on emitters are mentioned in the above paragraph, for example, this shall also be understood to denote that emitters which are operating in pulsed mode also operate in this pulsed mode during in-line operation of the blow-molding machine.

BRIEF DESCRIPTION OF THE DRAWING

Illustrative embodiments are represented schematically in the drawings for the further explanation of the invention. In the drawings.

DETAILED DESCRIPTION OF THE INVENTION

Figure 1:
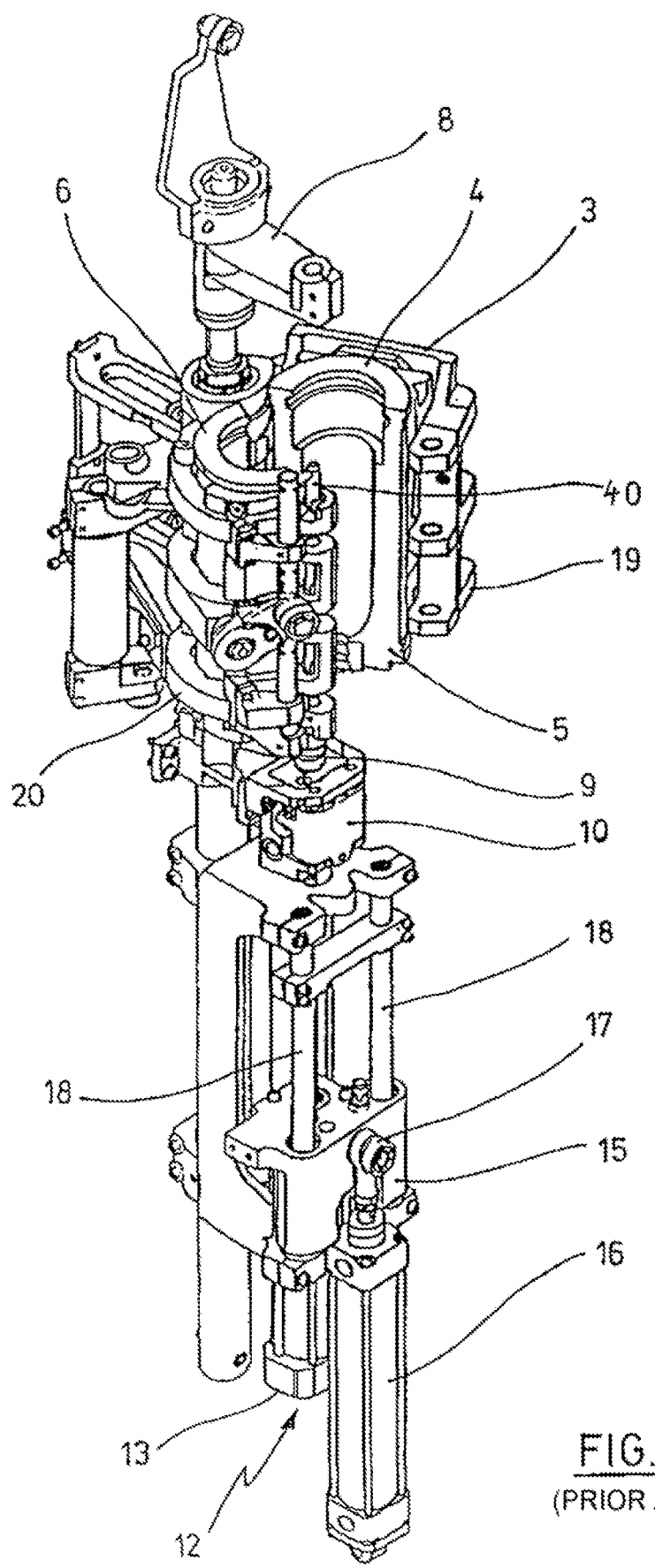
FIG. 1 depicts a perspective view of a blow-molding station for producing containers from preforms.
Figure 2:
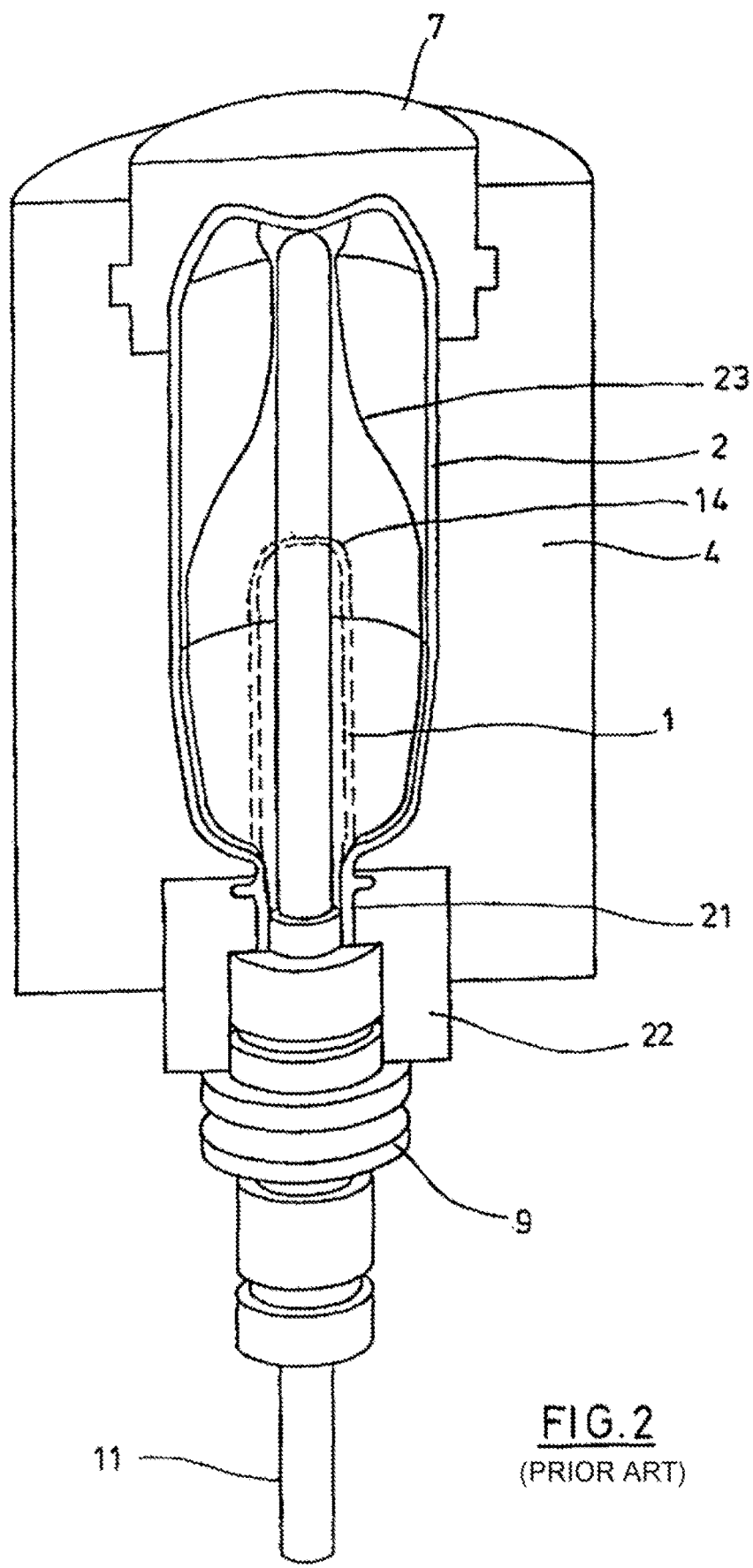
FIG. 2 depicts a longitudinal section through a blow-molding mold, in which a preform is stretched and expanded.

The basic structure of a device for forming preforms 1 into containers 2 is represented in FIG. 1 and in FIG. 2.

The device for forming the container 2 consists essentially of a blow-molding station 3, which is provided with a blow mold 4, into which a preform 1 is capable of being inserted. The preform 1 can be an injection-molded component made of polyethylene terephthalate. In order to permit the insertion of the preform 1 into the blow mold 4, and in order to permit the removal of the finished container 2, the blow mold 4 consists of mold halves 5, 6 and a floor part 7, which is capable of being positioned by a lifting device 8. The preform 1 can be retained in the region of the blow-molding station 3 by a transport mandrel 9, which, together with the preform 1, passes through a plurality of processing stations inside the device. It is also possible, however, to insert the preform 1 directly into the blow mold 4, for example with grippers or other handling means.

In order to permit the supply of compressed air, a connection piston 10 is arranged underneath the transport mandrel 9, which piston supplies compressed air to the preform 1 and, at the same time, provides a seal relative to the transport mandrel 9. In a modified design, however, it is basically also conceivable to utilize fixed compressed air supply lines.

Stretching of the preform 1 takes place with the help of a stretching rod 11, which is positioned by a cylinder 12. It is basically also conceivable, however, to undertake mechanical positioning of the stretching rod 11 over curve segments, which are acted upon by pick-up rollers. The use of curve segments is particularly appropriate if a multiplicity of blow-molding stations 3 are arranged on a rotating blowing wheel. The use of cylinders 12 is appropriate if blow-molding stations 3 that are disposed in a locationally fixed manner are used.

In the embodiment represented in FIG. 1, the stretching system is configured in such a way that a tandem arrangement of two cylinders 12 is provided. The stretching rod 11 is displaced initially from a primary cylinder 13 before the start of the actual stretching process into the region of a floor 14 of the preform 1. During the actual stretching process, the primary cylinder 13 with the stretching rod extended is positioned together with a carriage 15 supporting the primary cylinder 13 by a secondary cylinder 16 or via a cam control system. In particular, the intention is to utilize the secondary cylinder 16 with cam control in such a way that an actual stretching position is determined by a guide roller 17, which slides along a curved path in the course of performing the stretching process. The guide roller 17 is pressed against the guide track by the secondary cylinder 16. The carriage 15 slides along two guide elements 18.

After closing the mold halves 5, 6 arranged in the region of carriers 19, 20, locking of the carriers 19, 20 relative to one another takes place with the help of a locking device 40.

The use of separate threaded inserts 22 in the region of the blow mold 4 is proposed according to FIG. 2 for the purpose of adapting to different shapes of an opening region 21 of the preform 1.

FIG. 2 also depicts the preform 1 marked with broken lines, in addition to the blow-molded container 2, as well as a schematically depicted developing container bubble 23.

Figure 3:
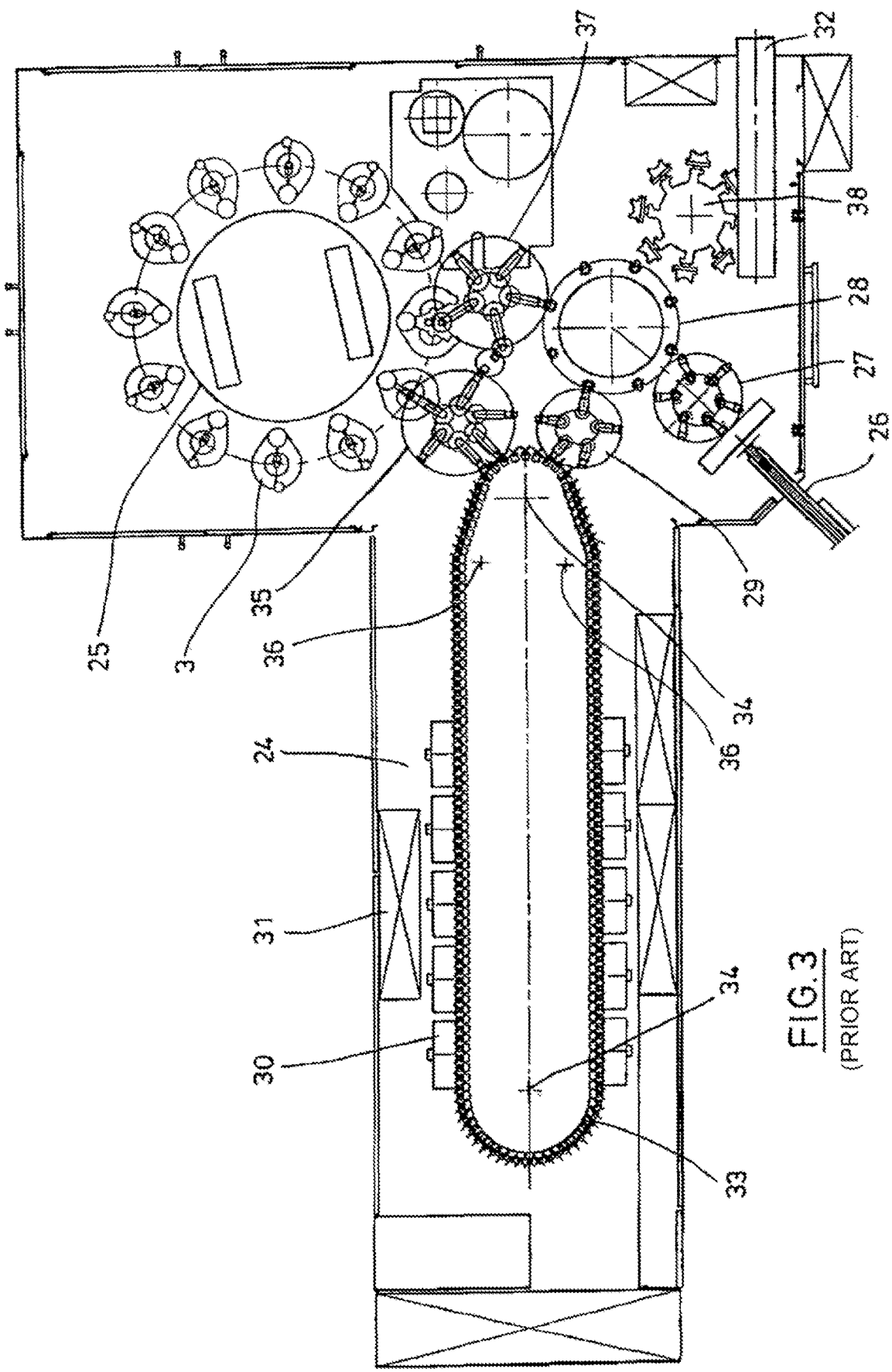
FIG. 3 depicts a drawing to illustrate a basic construction of a device for the blow-molding of containers.

FIG. 3 depicts the basic construction of a blow-molding machine, which is provided with a heating section 24 as well as a rotating blowing wheel 25. Starting from a preform infeed station 26, the preforms 1 are transported by transfer wheels 27, 28, 29 along a transport path into the region of the heating section 24. Radiant heaters 30 and fans 31 are arranged along the heating section 24 in order to temperature condition the preforms 1. After adequate temperature conditioning of the preforms 1, these are transferred to the blowing wheel 25, in the region of which the blowing stations 3 are arranged. The finished blown containers 2 are fed to a discharge section 32 by further transfer wheels.

In order to be able to mold a preform 1 into a container 2 in such a way that the container 2 exhibits material characteristics which guarantee a long shelf life for the foodstuffs contained in the container 2, in particular beverages, specific process steps must be followed in conjunction with the heating and orientation of the preforms 1. Advantageous effects can be achieved in addition by adhering to specific dimensioning specifications.

Various plastics can be used as a thermoplastic material. PET, PEN or PP, for example, are suitable materials.

The expansion of the preforms 1 during the orientation process is effected by the supply of compressed air. The supply of compressed air is subdivided into a pre-blowing phase, in which gas, for example compressed air, is supplied at a low pressure level, and into a subsequent main blowing phase, in which gas is supplied at a higher pressure level. During the pre-blowing phase, compressed air is typically used at a pressure in the range from 10 bar to 25 bar, and during the main blowing phase, compressed air is supplied at a pressure in the range from 25 bar to 40 bar.

It can also be appreciated from FIG. 3 that the heating section 24 in the represented embodiment consists of a plurality of circulating transport elements 33, which are guided arranged in series in the manner of a chain and along deflector wheels 34. In particular, the intention is to clamp an essentially rectangular basic contour using the chain-like arrangement.

In the represented embodiment, a single deflector wheel 34 of relatively large dimensions is used in the region of the extension of the heating section 24 facing toward the transfer wheel 29 and an input wheel 35, and two deflector wheels 36 of comparatively smaller dimensions are used in the region of neighboring deflections. Any other guides are conceivable in principle, however.

The arrangement represented here has been found to be particularly effective in order to permit the closest possible arrangement of the transfer wheel 29 and the input wheel 35 relative to one another, since three deflector wheels 34, 36 are positioned in the region of the corresponding extensions of the heating section 24, the smaller deflector wheels 36 in each case being present in the region of the transition to the linear paths of the heating section 24, and the larger deflector wheel 34 being present in the immediate transfer region to the transfer wheel 29 and to the input wheel 35. It is also possible to use a rotating heating wheel, for example, as an alternative to the use of chain-like transport elements 33.

On completion of the blow-molding of the containers 2, these are taken from the region of the blow-molding stations 3 by an extraction wheel 37 and are transported to the discharge section 32 via the transfer wheel 28 and a discharge wheel 38.

Figure 4:
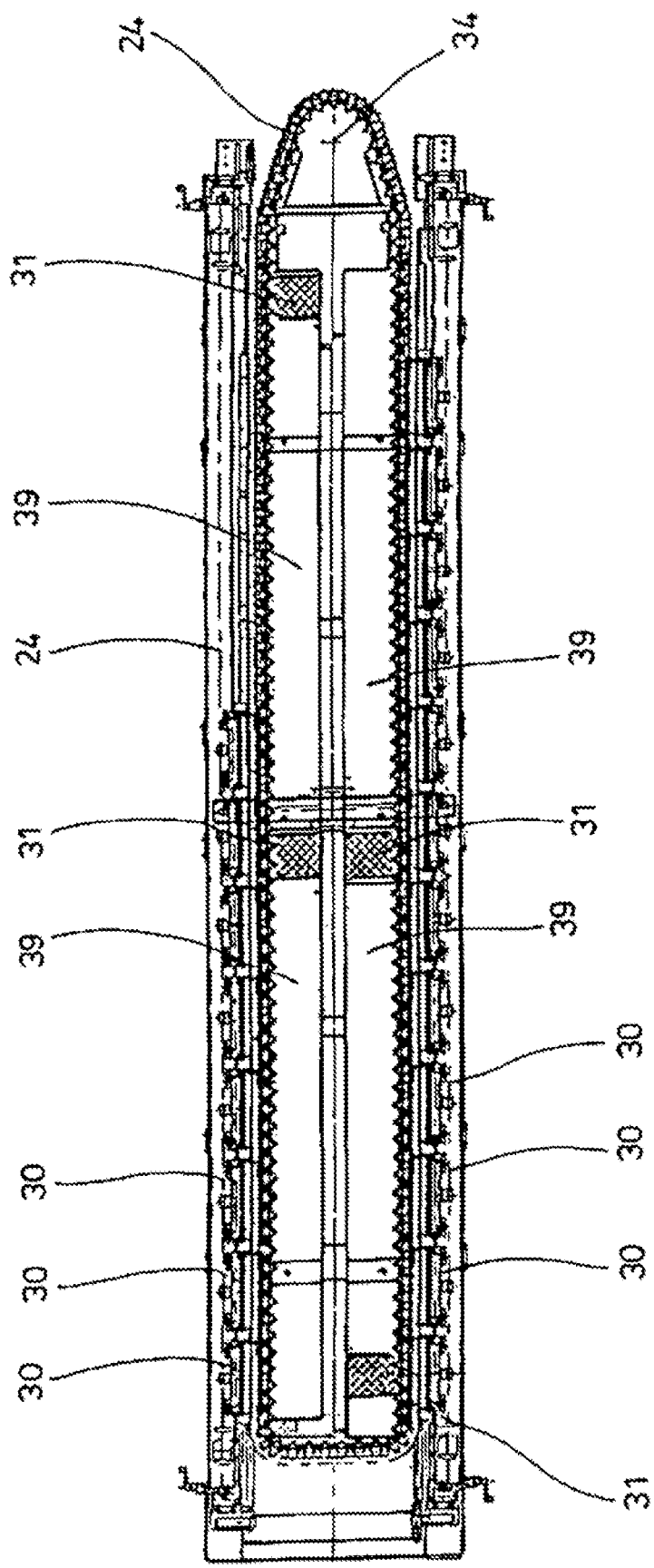
FIG. 4 depicts a modified heating section with an enlarged heating capacity.

In the modified heating section 24 represented in FIG. 4, a larger quantity of preforms 1 per unit of time can be temperature conditioned through the larger number of radiant heaters 30. The fans 31 in this case conduct cooling air into the region of cooling air channels 39, which in each case are situated opposite the assigned radiant heaters 30 and deliver the cooling air via outflow orifices. A direction of flow for the cooling air essentially transversely to a direction of transport of the preforms 1 is achieved through the arrangement of the outflow directions. The cooling air channels 39 can provide reflectors for the thermal radiation in the region of surfaces situated opposite the radiant heaters 30, so that it is likewise also possible to achieve cooling of the radiant heaters 30 by means of the discharged cooling air.

Not depicted here is a sterilizing device which can be arranged, for example, in the region of the heating section 24, as depicted in WO 2012/083910 A1, for example, to which and to the content of which reference is made. The sterilizing device can also be arranged at another location, however, in particular upstream or downstream of the heating section. In a typical sterilizing device, a sterilizing agent is introduced preferably in a gaseous state into the preform 1. With regard to the sterilizing agent, the use of hydrogen peroxide in particular is envisaged.

In the illustrative embodiments represented in FIGS. 3 and 4, the radiant lamps 30 are arranged unilaterally along a direction of transport of the preforms 1 through the heating section 24. Reflectors are positioned opposite the radiant heaters 30 as a rule. The radiant heaters 30 are typically arranged in the region of heater boxes, wherein reflectors supported by the heater box are arranged on a side of the radiant heaters 30 facing away from the preforms 1. The reflectors preferably exhibit a reflecting profile. A filter disk, which possesses frequency-selective characteristics, can be positioned between the radiant heaters 30 and the preform 1. The filter disk can consist of quartz, for example.

The radiant heaters 30 preferably generate thermal radiation in the NIR range. Infrared radiators, light-emitting diodes or microwave energy emitters or high-frequency energy emitters can also be used, however.

A combination of two or more of the above-mentioned heat sources is also possible, where appropriate.

Figure 5:
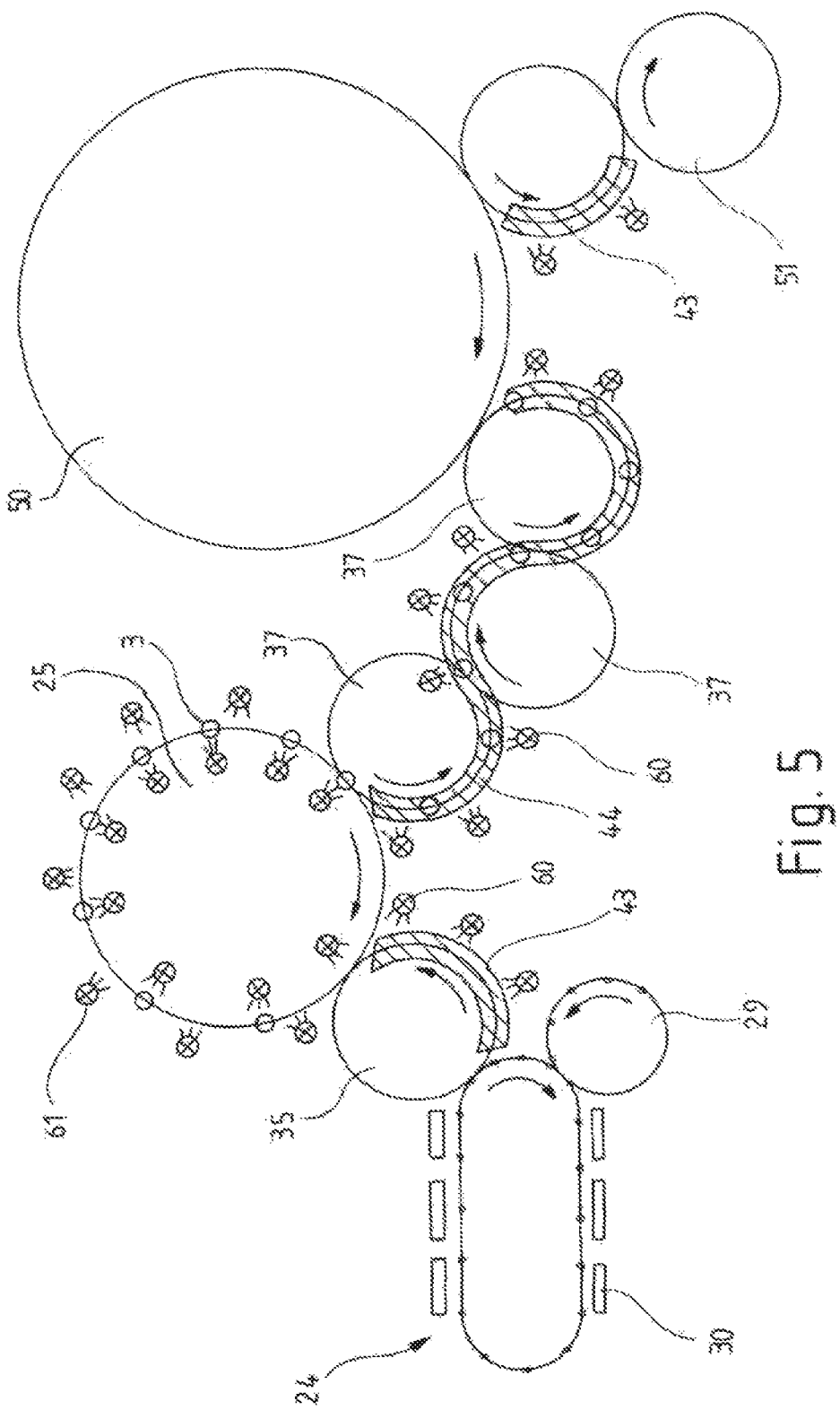
FIG. 5 depicts a schematic representation of the use of channels which conduct a sterile gas for connecting a heating device and a blowing wheel, together with the blowing wheel and a discharge section.

FIG. 5 depicts a schematic representation similar to the representation in FIG. 3, albeit more highly schematized. The preforms 1 in this case are heated in the region of the heating section 24. The heating section 24 is fed with preforms 1 unilaterally by an input wheel 29. On the output side, the preforms 1 that have been heated to the blow-molding temperature are transferred to a transfer wheel 35. Starting from the end of the heating section 24, a channel 43 extends in the direction of the blowing wheel 25. The channel 43 is used to supply the preform 1, at least in sections, with a sterile gas in such a way that the possibility of contamination of the preform 1 with microorganisms along the transport path is excluded. The channel 43 in this case is arranged and formed in such a way that it follows the movement path of the preforms 1 on the transfer wheel 35.

The preform 1 is inserted into a blowing station 3 in the region of the blowing wheel 25. In this case, too, provision is made for adequate sterile handling of the preform 1.

A discharge region of the blowing wheel 25 is also equipped with a channel 44, at least along the extraction wheel 37, which channel also provides a sterile gas corridor of sufficiently large dimensions in the same way as the channel 43, through which the blow-molded containers 2 in this case are transported, at least in regions.

The arrangement along the channel 43 and along the channel 44 of sources of radiation 60, which emit a sterilizing radiation, is indicated in FIG. 5 in a highly simplified representation. It may be assumed in the following, without loss of generality, that the source in this case is a UV emitter.

UV emitters are generally preferred sources of radiation in the context of the present invention, since they distinguish themselves from alternative sources of radiation, such as electron beam emitters, microwave emitters or X-ray emitters, by the fact that they are technically easier to operate and entail less expenditure for shielding. Suitable UV emitters are familiar from the prior art, for example UV-LEDs, low-pressure amalgam lamps, mercury vapor lamps (low pressure, medium pressure, high pressure and super high pressure), excimer lasers, diode lasers.

UV emitters are preferably arranged as sources of radiation which emit radiation, in particular in a wavelength range that is suitable for sterilization, for example in the range from 180-300 nm, whether it be narrowband or broadband, whether it be pulsed or in permanent emission mode. It is considered to be ideal if the radiation exhibits an intensity in the range of around 220 nm and/or 265 nm.

Depicted in FIG. 5 in an arrangement in which they are distributed around the periphery of the blowing wheel 25 in a similarly simplified representation are sources of radiation 61, which supply the blowing stations 3, the blow molds 5, 6 and/or the preforms 1 and/or the finished blown bottles 2, for example, with UV radiation. The emitters 61, for example, are able to move together with the blowing wheel 25, for example by being attached to the blowing wheel 25. As an alternative thereto, they are capable of being arranged in a stationary manner outside the blowing wheel 25. The use of both accompanying and stationary sources of radiation is also possible and advantageous, in order to achieve the maintenance of sterility as seamlessly as possible. The aforementioned sources of radiation 60, 61 are used at the start of production by the blowing machine primarily for the sterilization of the irradiated regions. This should be understood to denote that non-sterile regions are sterilized. During ongoing production, the sources of radiation 60, 61 are used to maintain sterility. This should be understood to denote that regions that have already been sterilized are protected against recolonization by microorganisms.

Figure 6:
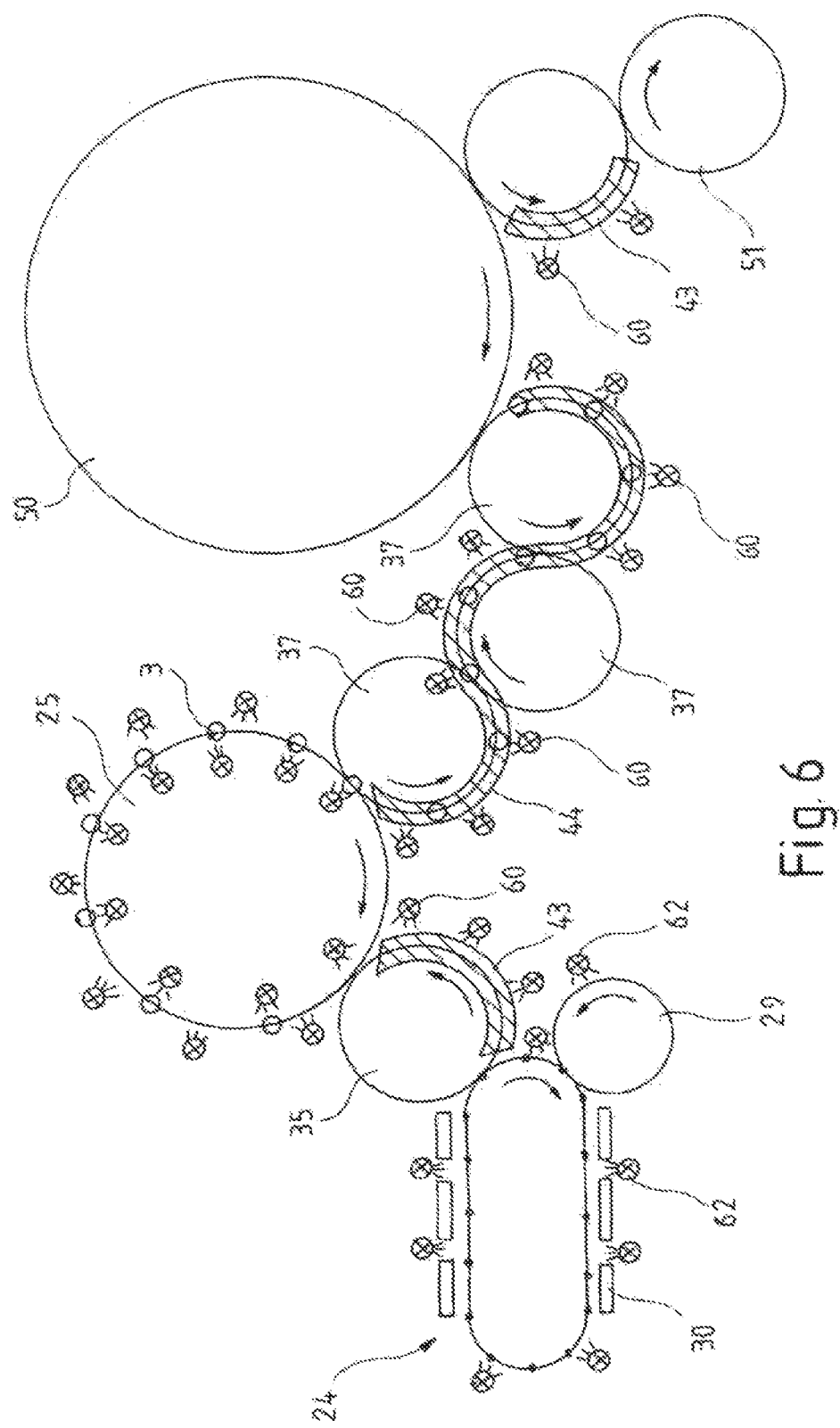
FIG. 6 depicts a schematic representation similar to FIG. 5 of an alternative illustrative embodiment.

FIG. 6 depicts an adaptation of FIG. 5. Additional UV emitters 62 are arranged on the input wheel 29 and in the heating section 24, which UV emitters exert their germicidal effect in these regions, and, for example, are oriented toward the opening region 21 of the passing preforms 1.

Figure 7:
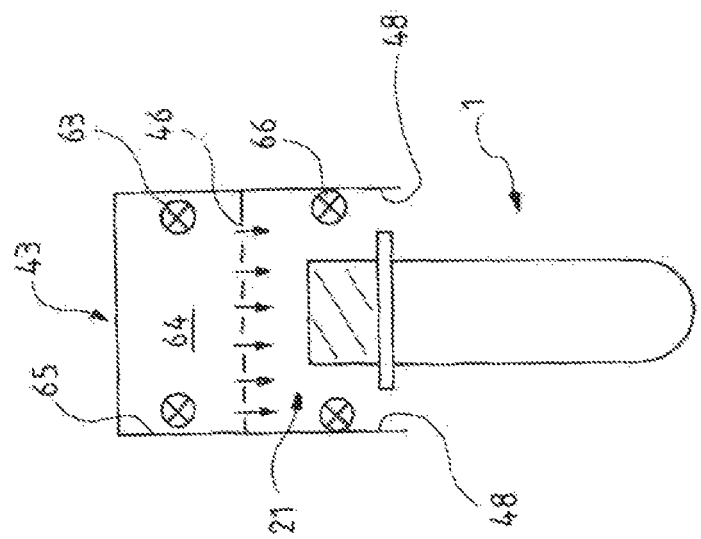
FIG. 7 depicts a schematic representation to illustrate the arrangement of the channel for producing a sterile gas corridor along a transport section for the preforms.

FIG. 7 depicts in a cross-sectional view a preform 1 which is guided along the channel 43. The channel 43 has a feed orifice (not illustrated here) for a sterile gas and a multiplicity of outflow orifices 46. In the illustrative embodiment depicted here, the outlet orifices 46 are arranged, for example, at an angle to a vertical direction. This results in a propagation component of the sterile gas flowing from the channel 43 in the transport direction of the preforms 1 along the channel 43. A flow of the sterile gas in the direction of an input region of the blowing wheel 25 is generated in this way, so that the introduction of the preforms 1 into the blowing station 3 is facilitated in a sterile environment.

The sterile gas flows from the channel 43 in such a way that at least the opening region 21 of the preform 1 is positioned inside the sterile gas, so that the ingress of microorganisms is prevented. A sterile gas corridor is provided in this way beneath the channel 43. The preform 1 is preferably displaced completely inside this corridor. It would also be acceptable, however, if only the opening region 21 were to be displaced inside the corridor. This corridor is delimited in the upward direction by the channel 43, and in the lateral direction by the sterile gas which exits from the outflow orifices 46 that are situated furthest to the side. Sterile gas flows inside the corridor, and the preform 1 that is conveyed along the corridor is surrounded by sterile gas and as a result is shielded against the ingress of microorganisms.

Arranged inside the channel 43 are UV emitters 63, which subject the interior 64 of the channel in particular and also the sterile gas that is supplied in the channel 43 to UV radiation. The internal walls 65 of the channel 43 are also permanently irradiated with UV radiation, so that continuous sterility is assured.

Depicted beneath the channel 43 are UV emitters 66, which are arranged laterally at the level of the opening region 21 of a preform 1 and are oriented toward this region. These emitters 66 can be attached to the channel 43, for example.

Figure 8:
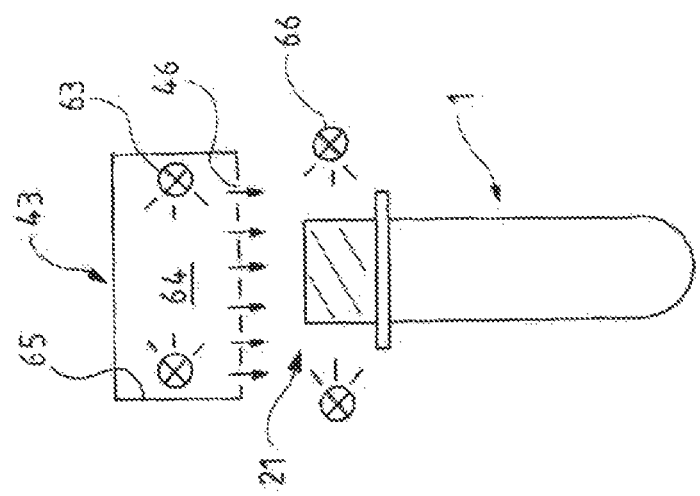
FIG. 8 depicts a modified embodiment compared with FIG. 7.

FIG. 8 depicts a modified construction compared with the illustrative embodiment in FIG. 7. Additional side walls 48 are used here, which provide additional lateral shielding for the opening region 21 of the preform 1 and delimit the sterile gas corridor laterally. The side walls 48 facilitate the flow control of the sterile gas.

The channel 44 depicted in FIGS. 5 and 6, which extends from the blowing wheel 25 into the region of a filling device 50 for filling the containers 2 with a product, can be constructed in the same way as the channel 43 previously described on the basis of FIGS. 5 and 6. The preform 1 represented in these figures could similarly be replaced by a finished blown container 2, of which the opening region is guided inside and along the sterile gas corridor. The channel 44 can extend in particular as far as a closing device 51. A sufficiently sterile environment for the whole of the transport path of the container 2 is provided in this way.

In the region of the blowing stations 3, preferably the only regions to be kept sterile are those which come into contact with the opening region 21 or with an internal space of the preform 1 or the container 2. With regard to the further regions of the preform 1 or the container 2, on the other hand, no requirements are imposed in respect of particular sterility. This locally delimited sterility takes account of the fact that, after filling the container 2 with the product to be filled, the filled internal space of the container 2 is isolated from the environment in a sterile manner by an appropriate closure. Any microorganisms which may adhere to an external surface are thus not able to gain access to the region of the filled product.

The invention claimed is:

1. A device for producing a blow-molded container which is sterile at least in some areas, the device comprising:
    a blow-molding station for blow-molding a heated, sterile preform made of a thermoplastic material into a finished blow-molded container;
    transport means for guiding the sterile preform and the finished blow-molded container on a transport path in a transport direction through the device;
    a channel that conducts a sterile gas, the channel being arranged such that the channel is above the sterile preform as the sterile preform is guided along a portion of the transport path that extends from a heating section of the device to the blow-molding station, the channel having outflow orifices arranged along the channel so as to direct the sterile gas such that it forms a continuous, uninterrupted sterile gas corridor outside the channel and along the channel, wherein the channel and the outflow orifices are arranged and configured so that at least an opening region of the sterile preform is guided by the transport means in the sterile gas corridor outside the channel; and
    multiple radiation sources fixedly arranged external to the sterile preform along the channel and the sterile gas corridor one behind another in the transport direction, said radiation sources emitting a sterilizing radiation onto the sterile preform guided by the transport means and onto the sterile gas corridor, wherein at least some of the multiple radiation sources emit the sterilizing radiation toward the opening region of the preform.

2. The device as claimed in claim 1, wherein the outflow orifices are oriented so that the sterile gas flows with a propagation component in the transport direction.

3. The device as claimed in claim 1, wherein at least some of the multiple radiation sources emit the sterilizing radiation toward an internal wall of the channel and are arranged inside the channel behind one another in the transport direction.

4. The device as claimed in claim 1, and further comprising:
    a filling device;
    a second channel that conducts a sterile gas, the second channel being arranged such that the second channel is above the finished blow-molded container as the finished blow-molded container is guided along a portion of the transport path that extends from the blow-molding station to the filling device, the second channel having outflow orifices arranged along the second channel so as to direct the sterile gas such that it forms a continuous, uninterrupted sterile gas corridor outside the second channel and along the second channel, wherein the second channel and the outflow orifices are arranged and configured so that at least an opening region of the finished blow-molded container is guided by the transport means in the sterile gas corridor outside the second channel; and
    multiple radiation sources fixedly arranged external to the finished blow-molded container and oriented along the second channel and the sterile gas corridor one behind another in the transport direction, said radiation sources emitting a sterilizing radiation onto the finished blow-molded container guided by the transport means and onto the sterile gas corridor, wherein at least some of the multiple radiation sources emit the sterilizing radiation toward the opening region of the blow-molded container.

5. The device as claimed in claim 4, and further comprising:
    a closing device;
    a third channel that conducts a sterile gas, the third channel being arranged such that the third channel is above the finished blow-molded container filled in the filling device as the finished blow-molded container filled in the filling device is guided along a portion of the transport path that extends from the filling device to the closing device, the third channel having outflow orifices arranged along the third channel so as to direct the sterile gas such that it forms a continuous, uninterrupted sterile gas corridor outside the third channel and along the third channel, wherein the third channel and the outflow orifices are arranged and configured so that at least an opening region of the finished blow-molded container filled in the filling device is guided by the transport means in the sterile gas corridor outside the third channel; and
    multiple radiation sources fixedly arranged external to the finished blow-molded container filled in the filling device and oriented along the third channel and the sterile gas corridor one behind-ene another in the transport direction, said radiation sources emitting a sterilizing radiation onto the finished blow-molded container filled in the filling device guided by the transport means and onto the sterile gas corridor, wherein at least some of the multiple radiation sources emit the sterilizing radiation toward the opening region of the finished blow-molded container filled in the filling device.

6. The device as claimed in claim 5, further comprising additional radiation sources that are arranged in the heating section and/or in the blow-molding station and emit the sterilizing radiation toward the sterile preform and/or that are arranged in the filling device and emit the sterilizing radiation toward the finished blow-molded container and/or that are arranged in the closing device and emit the sterilizing radiation toward the finished blow-molded container filled in the filling device.

7. The device as claimed in claim 5, wherein the transport means comprises at least two adjacent rotating transport wheels that guide the finished blow-molded container filled in the filling device along the transport path, and wherein the third channel extends at least along part of the circumference of the two adjacent rotating transport wheels on which transport takes place.

8. The device as claimed in claim 4, wherein the transport means comprises at least two adjacent rotating transport wheels that guide the finished blow-molded container along the transport path, and wherein the second channel extends at least along part of the circumference of the two adjacent rotating transport wheels on which transport takes place.

9. The device as claimed in claim 1, wherein the radiation sources, at least in part, are UV emitters.

10. The device as claimed in claim 1, wherein the transport means comprises at least one rotating transport wheel, wherein the sterile preform is guided along the transport path by the at least one rotating transport wheel, and wherein the channel extends at least along part of a circumference of the transport wheel on which transport takes place.

11. The device as claimed in claim 1, wherein the transport means comprises at least two adjacent rotating transport wheels that guide the sterile preform along the transport path, and wherein the channel extends at least along part of the circumference of the at least two adjacent transport wheels on which transport takes place.

12. The device as claimed in claim 1, wherein at least some of the radiation sources are fixed on the channel.

\* \* \* \* \*